US009090273B2

(12) United States Patent
Albert et al.

(10) Patent No.: US 9,090,273 B2
(45) Date of Patent: *Jul. 28, 2015

(54) WHEELBARROW LEG STABILIZER (71) Applicant: Ames True Termper, Inc., Camp Hill, PA (US)

(72) Inventors: Barry R. Albert, Dillsburg, PA (US); Daniel F. Marshall, Hudson, OH (US); Joshua O. Mullen, Duncannon, PA (US); Michael J. Lupey, Jr., Waterfall, PA (US)

(73) Assignee: THE AMES COMPANIES, INC., Camp Hill, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,455

(22) Filed: May 22, 2014

(65) Prior Publication Data

US 2014/0246838 A1    Sep. 4, 2014

Related U.S. Application Data (63) Continuation of application No. 13/949,544, filed on Jul. 24, 2013, now Pat. No. 8,752,847, which is a continuation of application No. 13/167,840, filed on Jun. 24, 2011, now Pat. No. 8,523,198.

(51) Int. Cl.
*B62B 1/00*     (2006.01)
*B62B 1/20*     (2006.01)
*B62B 5/04*     (2006.01)
*B62B 1/18*     (2006.01)
*B62B 5/00*     (2006.01)

(52) U.S. Cl.
CPC . *B62B 1/008* (2013.01); *B62B 1/18* (2013.01); *B62B 1/20* (2013.01); *B62B 5/00* (2013.01); *B62B 5/049* (2013.01)

(58) Field of Classification Search
USPC ........... 280/47.31, 43.14, 43.24, 43.248, 655, 280/656, 767, 47.23, 47.18, 47.32
See application file for complete search history.

(56) References Cited

U.S. PATENT DOCUMENTS

| | | |
|---|---|---|
| D404,881 S | 1/1999 | Shuchart et al. |
| D404,882 S | 1/1999 | Shuchart et al. |
| D404,883 S | 1/1999 | Shuchart et al. |
| D408,607 S | 4/1999 | Shuchart et al. |
| D408,955 S | 4/1999 | Shuchart et al. |
| 6,533,227 B1 | 3/2003 | Rom |
| D487,833 S | 3/2004 | Parker |
| 6,820,880 B2 | 11/2004 | Benton et al. |
| 7,000,929 B1 | 2/2006 | Liu |
| D530,879 S | 10/2006 | Jimenez et al. |
| 7,296,879 B2 | 11/2007 | Fukunaga et al. |
| D588,323 S | 3/2009 | Zimmerman |

(Continued)

*Primary Examiner* — Hau Phan
(74) *Attorney, Agent, or Firm* — Eckert Seamans Cherin & Mellott, LLC; David C. Jenkins (57) ABSTRACT A wheelbarrow leg stabilizer having a slip resistant lower surface is provided. Preferably, the slip resistant lower surface includes a plurality of edges structured to engage the ground and thereby increase the starting friction. More preferably, the edges are part of a deformation in the leg stabilizer body. When the stabilizer body is constructed from a generally planar metal member, the deformations may be punched in the stabilizer body thereby creating openings adjacent the deformations. This configuration provides for both an edge that engages the ground but also a face that creates a larger contact surface with the ground.

18 Claims, 7 Drawing Sheets

(56) References Cited

U.S. PATENT DOCUMENTS

| | | |
|---|---|---|
| 7,748,723 B2 | 7/2010 | Jimenez |
| D631,632 S | 1/2011 | Jimenez |
| 8,523,198 B2 * | 9/2013 | Albert et al. ............... 280/47.31 |
| 8,752,847 B2 * | 6/2014 | Albert et al. ............... 280/47.31 |
| 2008/0246240 A1 | 10/2008 | Jimenez |

* cited by examiner

WHEELBARROW LEG STABILIZER

CROSS REFERENCE TO RELATED APPLICATION

This application is a continuation of U.S. patent application Ser. No. 13/949,544, filed Jul. 24, 2013, entitled WHEELBARROW LEG STABILIZER, which application is a continuation of U.S. patent application Ser. No. 13/167,840, filed Jun. 24, 2011, entitled WHEELBARROW LEG STABILIZER.

BACKGROUND OF THE INVENTION

1. Field of the Invention

The present invention relates to wheelbarrows and, more specifically, to a wheelbarrow having a leg stabilizer with a slip resistant surface.

2. Description of the Related Art

As is well known, a wheelbarrow has a hopper or tray and a frame assembly. The frame assembly includes a plurality of rigid frame members, at least one wheel, typically disposed at the front of the tray, and a pair of handles extending behind the tray. Two elongated frame members typically form a yoke to support the wheel and the backwardly extending handles. The frame members further include at least one, and typically two, legs structured to engage the ground when the wheelbarrow is at rest. The legs may be columnar members, i.e. generally straight posts, or, more typically, are generally U-shaped members having two "tines" and a "bight." The bight is the portion of the leg members that engages the ground. The tines extend upwardly and are coupled to the elongated frame members forming the yoke/handles The tines and the bight are, typically, elongated and straight. That is, the legs are "generally" U-shaped, but the bight is not curved except at the ends where a transition portion curves into the tines. The bight is structured to extend generally parallel to the ground. Hereinafter, it is assumed that the ground is flat and horizontal. Thus, the bight portion of each leg extends generally horizontally. In this configuration, substantially the entire lower surface of the bight engages the ground.

The traditional wheelbarrow frame has been improved by adding stabilizers to the legs. A typical stabilizer, see e.g. U.S. Des. Pat. No. 408,955, is also a generally U-shaped body that is coupled to the backward tine of a frame assembly leg. One of the tines of the stabilizer is aligned with the bight and extends therefrom. That is, the stabilizer's U-shaped body is oriented sideways relative to the leg. The other tine of the stabilizer body extends upwardly and is coupled to the tine of the leg. In this configuration, the leg stabilizer increases the length of the ground engaging portion of the leg and helps support the leg. The longer ground engaging portion provides for a greater area of contact between the wheelbarrow and the ground. Thus, there is an increase in the static friction or "starting friction" between the ground and the wheelbarrow. While this is not a substantial problem when a wheelbarrow is on flat ground, sliding becomes an issue on a sloped surface. That is, without a sufficient starting friction, a wheelbarrow may start to slide down a slope even when the legs are resting on the ground. The leg stabilizers presently in use have generally smooth lower surfaces. This is a problem because generally smooth surfaces do not create as much starting friction as a slip resistant surface.

SUMMARY OF THE INVENTION

The disclosed and claimed concept provides for a leg stabilizer having a slip resistant lower surface. Preferably, the slip resistant lower surface includes a plurality of edges structured to engage the ground and thereby increase the starting friction. More preferably, the edges are part of a deformation in the leg stabilizer body. When the stabilizer body is constructed from a generally planar metal member, the deformations may be punched in the stabilizer body thereby creating openings adjacent the deformations. This configuration provides for both an edge that engages the ground but also a face that creates a larger contact surface.

DETAILED DESCRIPTION

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other. The fixed components may, or may not, be directly coupled.

As used herein, the word "unitary" means a component is created as a single piece or unit. That is, a component that includes pieces that are created separately and then coupled together as a unit is not a "unitary" component or body.

As used herein, directional terms, such as, but not limited to, "forward," "back," "right," "left," "upper," "lower," and "lateral" correspond to the orientation of the wheelbarrow from the perspective of a user standing at the handle portion looking toward the hopper—that is, the normal position a user would occupy to move the wheelbarrow. Further, the "longitudinal" axis shall mean an axis extending forward/backward and the "lateral" axis shall mean an axis extending to the left/right. Such directional terms are not limiting upon the claims.

As used herein, "laterally extending," as in a "laterally extending edge," means that two points on the edge are spaced laterally from each other. The edge may, however, extend a greater distance in the longitudinal direction. For example, a "V" shaped edge, wherein the longitudinal axis of the "V" is aligned with the longitudinal axis of the wheelbarrow has a "laterally extending" edge even though the edge may extend for a greater distance in the longitudinal direction.

As used herein, "laterally perpendicular," as in a "laterally perpendicular edge," means that the edge extends substantially in a lateral direction.

As used herein, "structured to engage the ground," when used in reference to a surface contacting the ground, means that the surface has at least one thin protrusion, or a protrusion with an edge, wherein force may be concentrated. That is, a generally smooth surface with no protrusions, or rounded protrusions, is not "structured to engage the ground."

Figure 1:
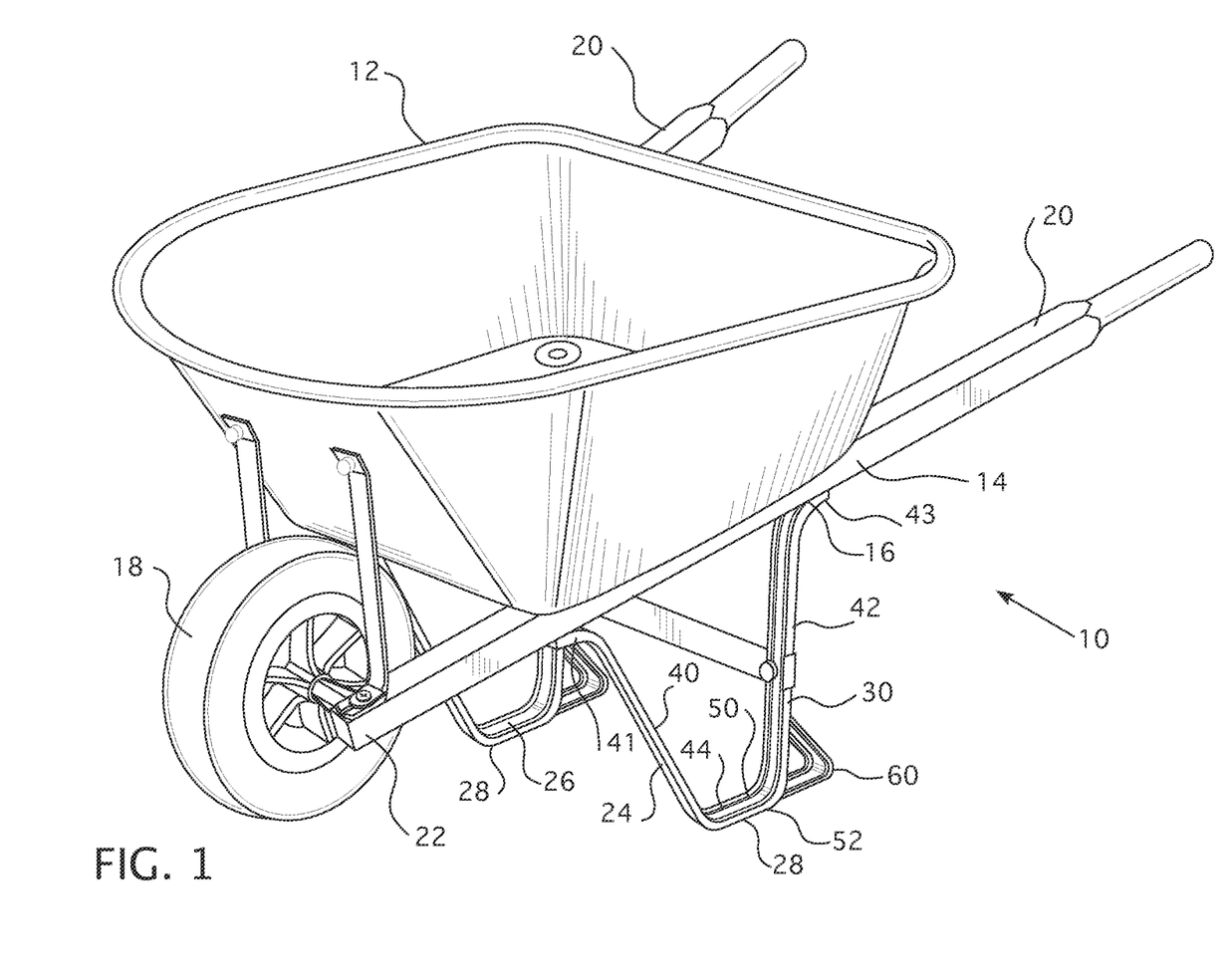
FIG. 1 is an isometric view of a wheelbarrow.
Figure 2:
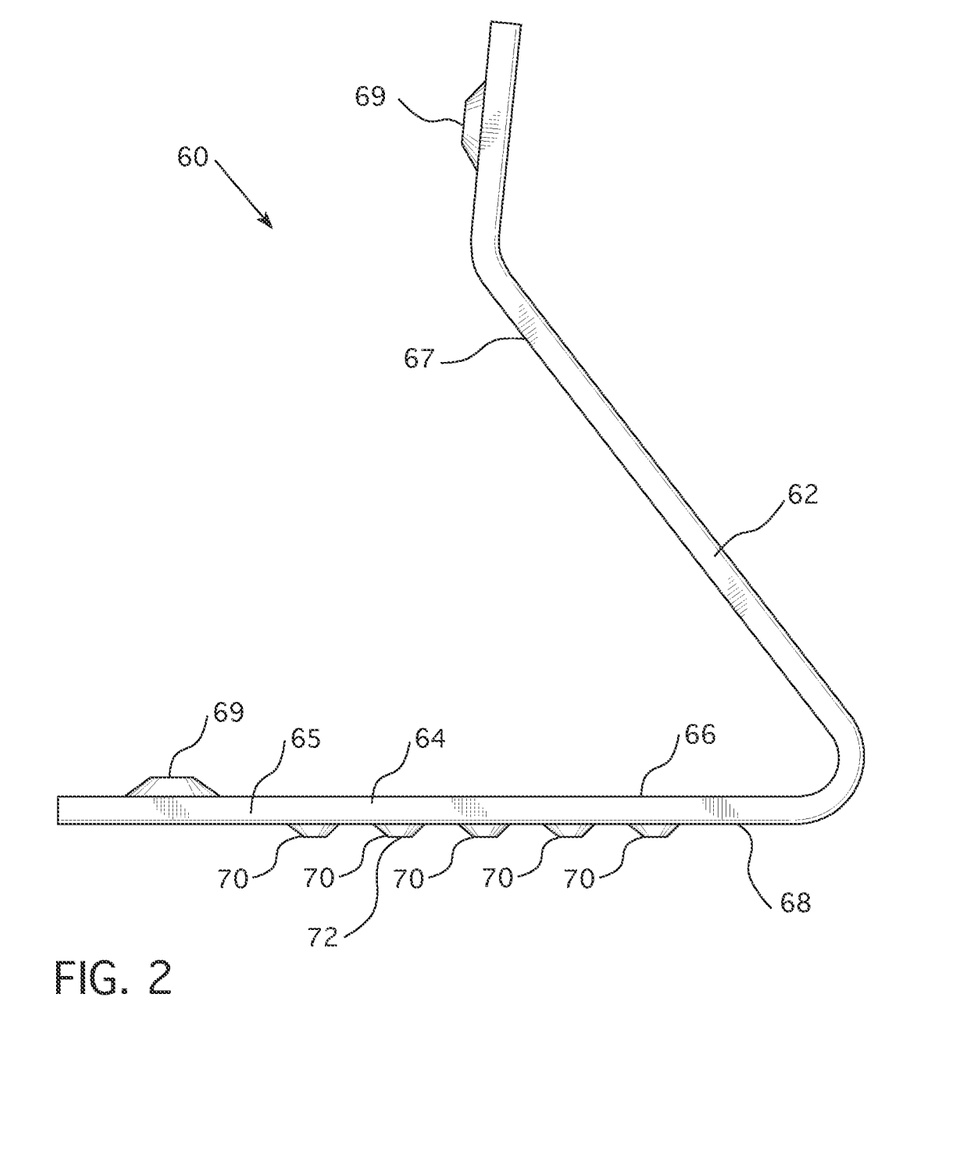
FIG. 2 is a side view of one embodiment of a leg stabilizer with a slip resistant member.

As shown in FIG. 1, a wheelbarrow 10 has a tray 12 and a frame assembly 14. Hereinafter, it is assumed that the wheelbarrow 10 is resting on generally flat ground unless otherwise noted. The frame assembly 14 includes a plurality of rigid members 16 structured to support the tray 12 as well as a wheel 18. Further, frame assembly members 16 extend backwardly from the tray 12 and may be used as handles 20. Frame assembly members 16 also extend forwardly and form a yoke 22 that is structured to rotatably support the wheel 18. Typically, the yoke 22 is disposed at the front of the wheelbarrow 10 and is structured to support one wheel 18. In this configuration, the frame assembly 14 further includes two legs 24, 26 structured to engage the ground. The ground engaging legs 24, 26 along with the wheel 18 provide three support points for the wheelbarrow 10, the minimum number to prevent the wheelbarrow 10 from tipping over when at rest. The ground engaging legs 24, 26 include a generally horizontal portion 28 structured to engage the ground.

The legs 24, 26 are substantially similar and hereinafter only one leg 24 will be used as an example. It is understood that the following description is applicable to both legs 24, 26. The leg 24 is generally a U-shaped body 30 and the leg body 30 may have a U-shaped cross-section. That is, the body 30 typically starts as an elongated rectangular member. Initially, the lateral edges, i.e. the edges extending in the longitudinal direction, of the rectangular member are bent to about ninety degrees relative to the broad middle portion of the rectangular member. In this configuration, the rectangular body has a U-shaped cross-section with square corners. The bent edges provide rigidity to the rectangular member. The rectangular member is then bent into a very general U-shape having two tines, a forward tine 40 and a rear tine 42, and a bight 44. The leg 24 has a "very general" U-shape in that the bight 44 is preferably elongated and generally flat and the tines 40, 42 are not parallel. The tines 40, 42 each have an upper, distal end 41, 43. The tine upper ends 41, 43 are coupled to the frame assembly 14 or the bottom of the tray 12. The bight 44 is the generally horizontal portion 28 structured to engage the ground. That is, the bight 44 extends generally parallel to the ground. The bight 44 has an upper surface 50 and a lower surface 52. The lower surface 52 engages the ground.

Figure 3:
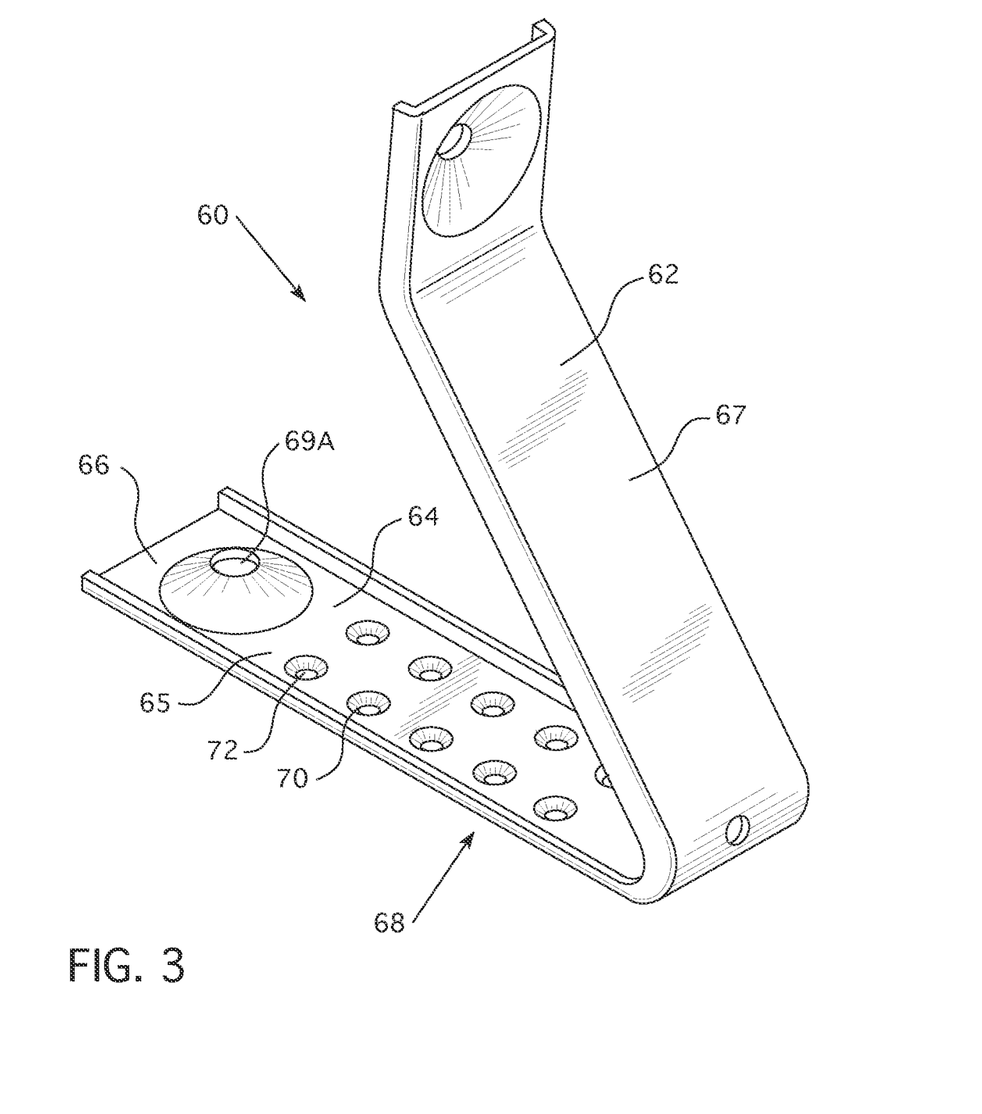
FIG. 3 is an isometric view of the leg stabilizer with a slip resistant member shown in FIG. 2.
Figure 4:
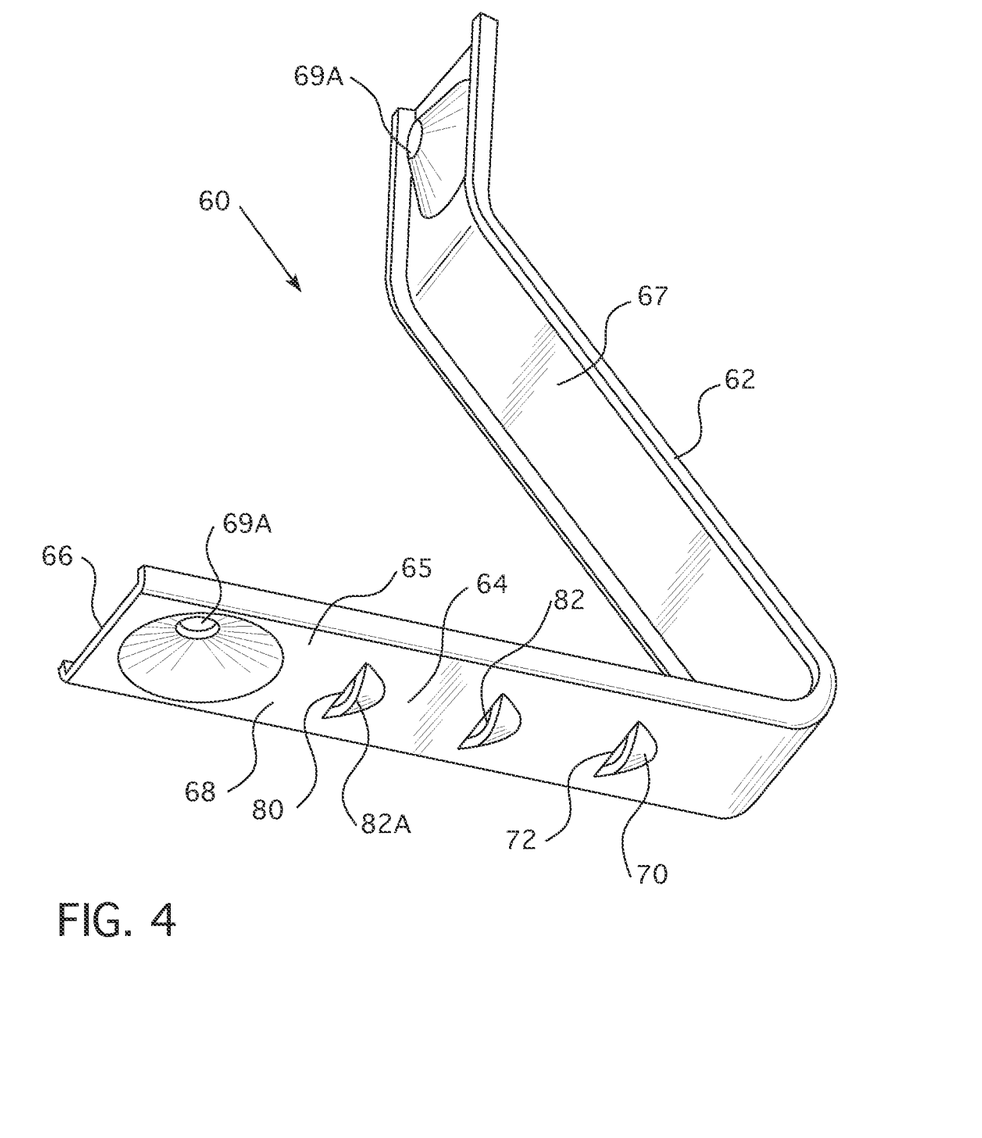
FIG. 4 is an isometric view of another embodiment of a leg stabilizer with a slip resistant member.

The frame assembly 14 further includes a leg stabilizer 60. A single leg stabilizer 60 is described but it is understood that a stabilizer 60 may be coupled to each leg 24, 26. Various embodiments of the leg stabilizer are shown in FIGS. 2-6. Each of the embodiments include the following features. The stabilizer 60 is an elongated body 62 having an elongated, generally horizontal, slip resistant member 64. The stabilizer 60 is coupled to the ground engaging leg 24 with the slip resistant member 64 being generally aligned with the ground engaging leg generally horizontal portion 28, i.e. the bight 44. The stabilizer 60 may be formed in a manner similar to the leg 24 described above. That is, in one embodiment the stabilizer 60 is a unitary body, such as a thin, rectangular member, preferably made of a sheet metal such as, but not limited to, steel. The lateral edges are bent to about ninety degrees, thereby stiffening the rectangular member and providing a U-shaped cross-section. Further, the body 62 itself may be shaped very generally as a sideways "U" or a "V" having two tines, a horizontal tine 65 and a vertically angled tine 67. That is, the body 62 is oriented sideways so that the horizontal tine 65 extends generally horizontally and the vertically angled tine 67 extends upwardly at an angle. The generally horizontal tine 65 is disposed in about the same plane as the leg bight 44. The vertically angled tine 67 is coupled to, and supports, the leg rear tine 42. The leg stabilizer further includes a coupling device 69 such as, but not limited to, a fastener opening 69A through which a fastener may extend. The frame assembly leg 24 includes corresponding fastener openings (not shown), The slip resistant member 64 may be a portion of the stabilizer unitary body 62 or a slip resistant separate member 64A, as discussed below, and includes an upper surface 66 and a lower surface 68. The slip resistant member lower surface 68 has at least one downwardly extending protrusion 70 that is structured to engage the ground. More preferably, the protrusion 70 has an edge 72 that is structured to engage the ground. That is, the "edge," as used herein, has an angle greater than about 10 degrees and is not rounded. At least a portion of the protrusion edge 72 is a laterally extending edge and, more preferably, the protrusion edge 72 is a laterally perpendicular edge. The edge 72 is discussed in detail below. Further, there may be, and preferably are, more than one protrusion 70. For example, as shown in FIG. 4, there are three protrusions 70 disposed on and along the longitudinal axis of the slip resistant member 64. An alternate embodiment is shown in FIG. 3 having two rows of protrusions 70 disposed on either side of the longitudinal axis of the slip resistant member 64. Preferably, each protrusion 70 has an edge 72.

The protrusion 70 may be many shapes such as, but not limited to, X-shaped, V-shaped, +-shaped, or wavy lines (none shown). Each of these shapes have a lateral component, i.e. some portion of the pattern spaced laterally from another part. The protrusion edge 72 is located at least on the laterally spaced portions of the pattern. In a preferred embodiment, the protrusion edge 72 is a laterally perpendicular edge 72 and may be formed as described below.

Figure 5:
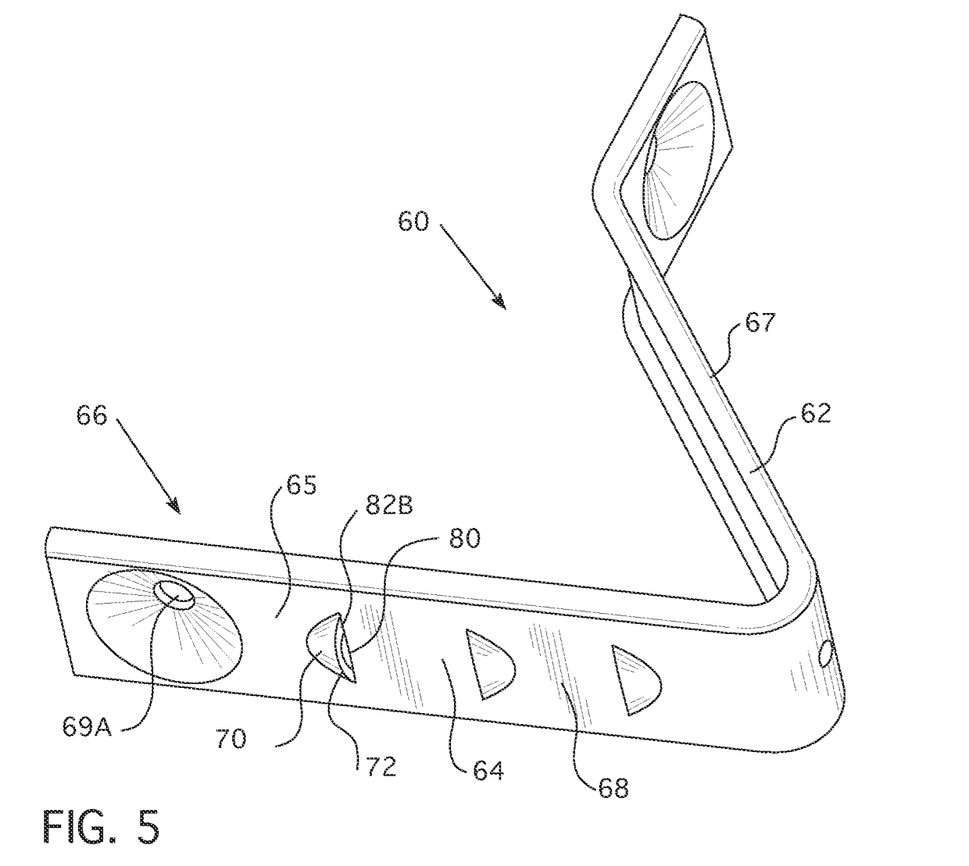
FIG. 5 is an isometric view of another embodiment of a leg stabilizer with a slip resistant member.

As noted above, the stabilizer body 62 may be made from sheet metal. Sheet metal may be deformed with a punch and die. Moreover, if a portion of the stabilizer body adjacent the punch is supported, i.e. not permitted to deform, the stabilizer body 62 will tear. That is, an opening 80 will form in the stabilizer body 62. In this configuration, the portion of the stabilizer body 62 that is deformed is the protrusion 70. Further, the protrusion 70 will have a sharp edge 72, typically about a ninety degree edge disposed adjacent to the opening 80. By way of example, a punch (not shown) may be shaped as a semi-circle. The portion of the stabilizer body 62 adjacent the diameter of the punch is supported. When the punch engages the stabilizer body 62 a semi-circular deformation or protrusion 70 is formed, as shown in FIGS. 4 and 5. Further, because a portion of the stabilizer body 62 was supported, that portion will not deform. If the deformation has a sufficient offset, i.e. depth below the plane of the stabilizer body 62, the stabilizer body 62 will tear forming a semi-circular protrusion 70 adjacent an opening 80, as shown in FIGS. 4 and 5.

This protrusion 70 has a sharp edge 72, typically about a ninety degree edge, adjacent the opening and along the portion of the protrusion 70 having the greatest deformation. This edge 72 is structured to engage the ground and thereby create a greater starting friction. Moreover, the protrusion 70 preferably includes a "face" 82, i.e., the substantially vertical surface adjacent the opening 80. The edge 72 is disposed at the lower periphery of the associated face 82. The face 82 of the protrusion 70 may also engage the ground or surface the wheelbarrow 10 is resting upon. For example, if a loaded wheelbarrow 10 is resting on a wooden ramp (not shown), the weight of the wheelbarrow 10 may cause the downwardly extending protrusion 70, and more specifically the edge 72 of the protrusion 70, to dig slightly into the wood. In this configuration, the face 82 of the protrusion 70 engages the wood and helps increase the starting friction.

It can be seen that the side of the semi-circular protrusions 70 opposite the face 82 is a rounded surface. That is, the side of the semi-circular protrusions 70 opposite the face 82 does not form an edge. This means that the wheelbarrow 10 has a reduced starting friction when moved in a direction aligned with a path extending from the face 82 towards the rounded portion of the protrusion 70. Thus, if there are multiple protrusions 70, as preferred, and if all the faces 82 faced the same direction, e.g. forward, the wheelbarrow 10 would be substantially resistant to moving in one direction, but not as resistant to moving in the other direction. Accordingly, it is preferred that the faces 82 face different directions. More specifically, and ignoring the slight inward angle associated with a typical frame assembly handle member 20, at least one protrusion face 82 is a forwardly facing face 82A and at least one protrusion face 82 is a backwardly facing face 82B, as shown alternately in FIGS. 4 and 5. In this configuration, the wheelbarrow 10 is resistant to slipping either forward or backward.

Figure 6:
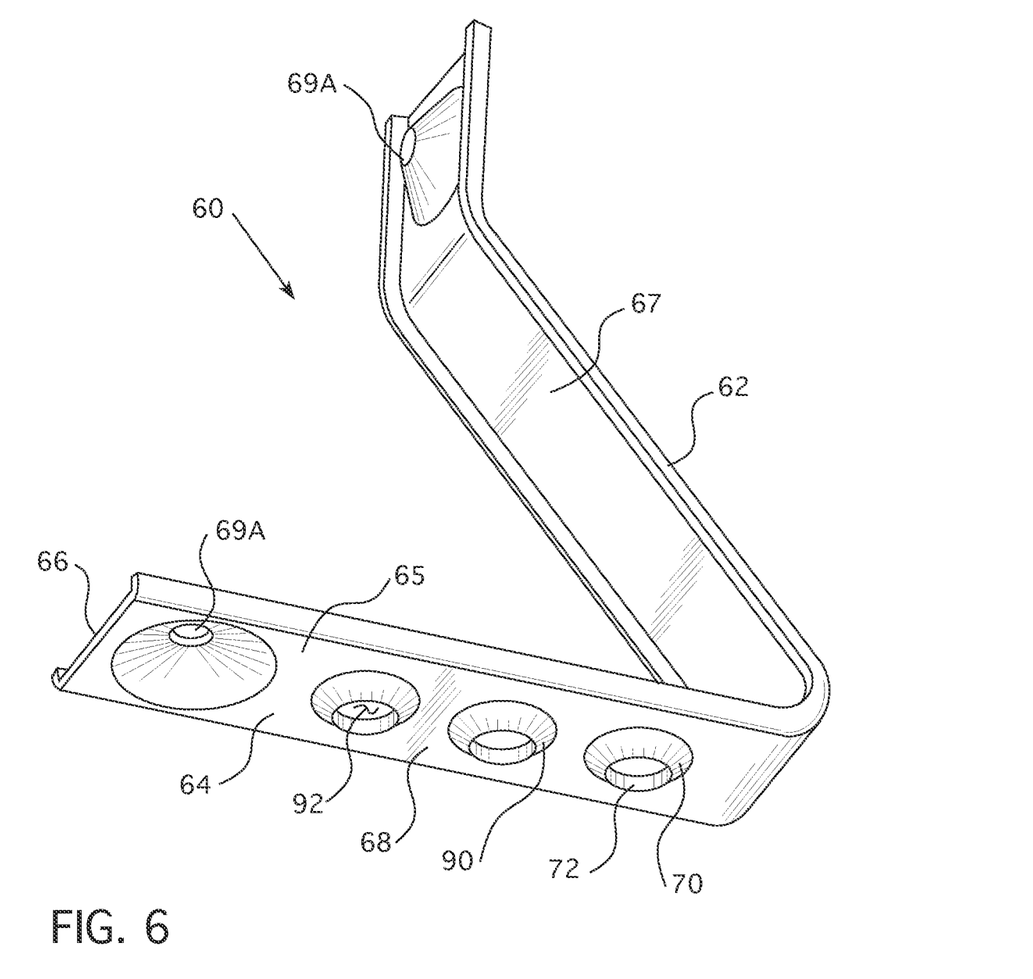
FIG. 6 is an isometric view of another embodiment of a leg stabilizer with a slip resistant member.

In another embodiment, shown in FIG. 6, the at least one protrusion 70 is shaped as a truncated cone 90. That is, the cone 90 extends downwardly to a central opening 92. The central opening 92 defines the edge 72. Preferably, the central opening 92 is circular, thereby providing an edge with portions that are laterally offset from each other, i.e. a lateral edge 72.

Figure 7:
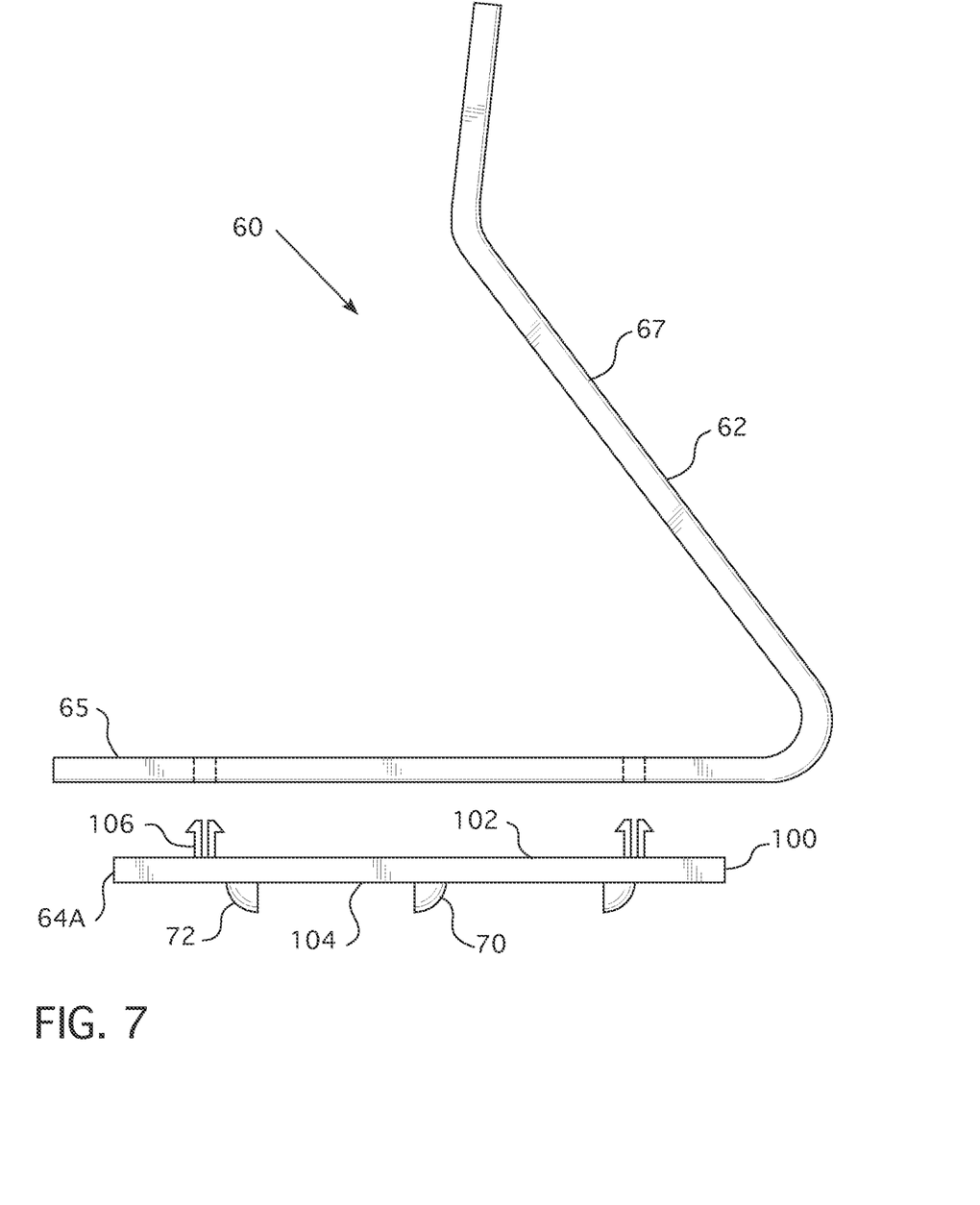
FIG. 7 is a side view of another embodiment of a leg stabilizer structured to be coupled to a slip resistant member.

In another embodiment, the slip resistant member 64 is a slip resistant separate member 64A, i.e., a slip resistant member body 100 that is coupled to stabilizer body 62. For example, the slip resistant member body 100 may be an elongated, rectangular body 100 having an upper surface 102 and a lower surface 104. As before, there is at least one, and preferably a plurality of, protrusion(s) 70 disposed on the slip resistant member body lower surface 104. These protrusions 70 may be of any type such as, but not limited to, those embodiments described above. The slip resistant member body 100 has a coupling device 106, as shown as a flanged clip, structured to couple the slip resistant member body 100 to the stabilizer body 62.

While a specific embodiment of the invention has been described in detail, it will be appreciated by those skilled in the art that various modifications and alternatives to those details could be developed in light of the overall teachings of the disclosure. For example, the wheelbarrow frame assembly 14 may be comprised of circular/tubular members. If so, the leg stabilizer body 62 and/or the slip resistant member 64 or slip resistant member body 100 may be shaped with a cross-sectional arc so as to match the frame assembly 14. In such a configuration, the protrusions 70 would, preferably, be disposed along the lowest portion of the slip resistant member 64 or slip resistant member body 100. Accordingly, the particular arrangements disclosed are meant to be illustrative only and not limiting as to the scope of the invention which is to be given the full breadth of the appended claims and any and all equivalents thereof.

What is claimed is:

1. A stabilizer for a wheelbarrow frame assembly leg, said wheelbarrow frame assembly having a plurality of rigid members structured to support a tray and structured to have at least one wheel rotatably coupled thereto, at least one frame member structured to act as a ground engaging leg to support a wheelbarrow at rest, said stabilizer comprising:
   a unitary body having a slip resistant member;
   said slip resistant member having an upper surface and a lower surface;
   said slip resistant member lower surface having at least one downwardly extending protrusion, said at least one protrusion structured to engage the ground;
   each said protrusion has at least one substantially vertical face;
   each said protrusion being a deformation in said slip resistant member;
   each said deformation creating an opening in said slip resistant member; and
   each said slip resistant member opening disposed adjacent to each said protrusion face.

2. The stabilizer of claim 1 wherein said at least cine protrusion has an edge, said edge structured to engage the ground.

3. The stabilizer of claim 2 wherein at least a portion of said protrusion edge is a laterally extending edge.

4. The stabilizer of claim 3 wherein:
   said at least one protrusion is shaped as a truncated cone; and
   said cone having a central opening, said central opening defining said edge.

5. The stabilizer of claim 3 wherein said laterally extending edge is a laterally perpendicular edge.

6. The stabilizer of claim 2 wherein:
   said at least one protrusion structured to engage the ground includes a plurality of protrusions;
   each of said plurality of protrusions having an edge structured to engage the ground; and
   each said protrusion edge having a laterally extending portion.

7. The stabilizer of claim 6 wherein said laterally extending edge is a laterally perpendicular edge.

8. The stabilizer of claim 6 wherein
   each said protrusion has at least one substantially vertical face;
   each said edge disposed at the lower periphery of the at least one protrusion vertical face.

9. The stabilizer of claim 8 wherein
   at least one said protrusion vertical face being a backwardly facing vertical face.

10. A wheelbarrow comprising:
   a tray;
   a frame assembly having a plurality of rigid members and at least one wheel;
   said rigid members structured to support said tray and structured to have said at least one wheel rotatably coupled thereto, at least one frame member structured to act as a ground engaging leg to support a wheelbarrow at rest;
   said ground engaging leg having a generally horizontal portion structured to engage the ground;
   a stabilizer including a unitary body having a slip resistant member;
   said slip resistant member having an upper surface and a lower surface;
   said slip resistant member lower surface having at least one downwardly extending protrusion, said at least one protrusion structured to engage the ground;
   each said protrusion has at least one substantially vertical face;
   each said protrusion being a deformation in said slip resistant member;
   each said deformation creating an opening in said slip resistant member; and
   each said slip resistant member opening disposed adjacent to each said protrusion face.

11. The wheelbarrow of claim 10 wherein said at least one protrusion has an edge, said edge structured to engage the ground.

12. The wheelbarrow of claim 11 wherein a east a portion of said protrusion edge is a laterally extending edge.

13. The wheelbarrow of claim 12 wherein:
said at least one protrusion is shaped as a truncated cone; and
said cone having a central opening, said central opening defining said edge.

14. The wheelbarrow of claim 12 wherein said laterally extending edge is a laterally perpendicular edge.

15. The wheelbarrow of claim 11 wherein:
said at least one protrusion structured to engage the ground includes a plurality of protrusions;
each of said plurality of protrusions having an edge structured to engage the ground; and
each said protrusion edge having a laterally extending portion.

16. The wheelbarrow of claim 15 wherein said laterally extending edge is a laterally perpendicular edge.

17. The wheelbarrow of claim 15 wherein:
each said protrusion has at least one substantially vertical face; and
each said edge disposed at the lower periphery of the at least one protrusion vertical face.

18. The wheelbarrow of claim 17 wherein
at least one said protrusion vertical face being a backwardly facing vertical face.

* * * * *